Feb. 7, 1956 W. C. CRANSTON, SR 2,733,748
CROSS CHAIN ATTACHING DEVICE
Filed March 17, 1954 2 Sheets-Sheet 1
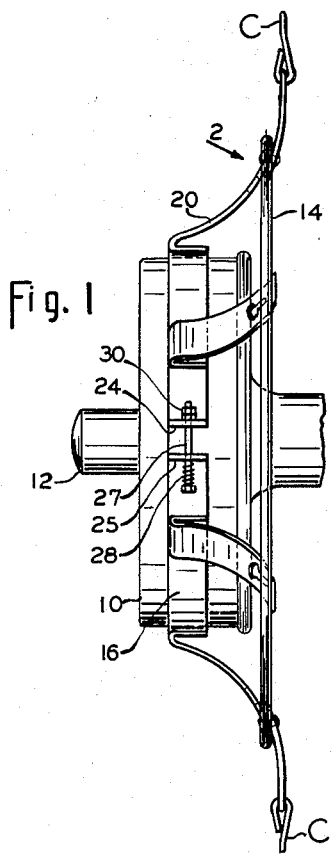
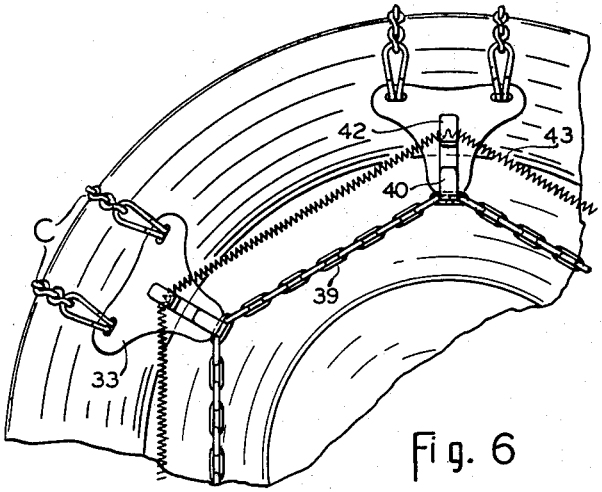
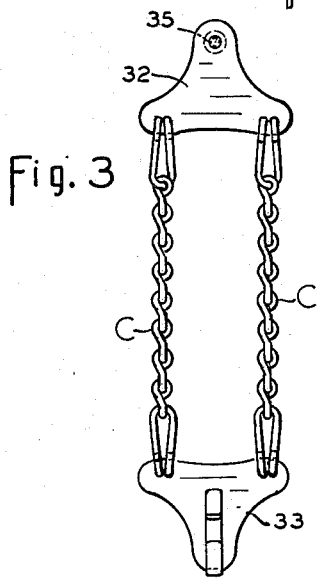
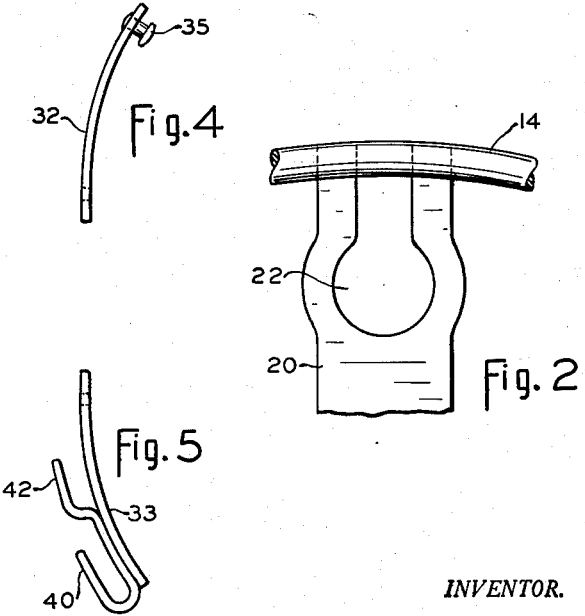
INVENTOR.
WALTER C. CRANSTON, SR.
BY
Chas. T. Hawley
ATTY.

Feb. 7, 1956   W. C. CRANSTON, SR   2,733,748
CROSS CHAIN ATTACHING DEVICE
Filed March 17, 1954   2 Sheets-Sheet 2

INVENTOR.
WALTER C. CRANSTON. SR.
BY
Chas. T. Hawley
ATT'Y.

United States Patent Office 2,733,748
Patented Feb. 7, 1956

2,733,748

CROSS CHAIN ATTACHING DEVICE

Walter C. Cranston, Sr., Worcester, Mass.

Application March 17, 1954, Serial No. 416,764

2 Claims. (Cl. 152—231)

This invention relates to cross chains as used on tires for automobiles and other vehicles, and relates more particularly to cross chains which are temporarily attached to a wheel and tire to meet bad driving conditions.

It is the general object of my invention to provide an improved attaching device to which separate cross chains or separate pairs of cross chains may be conveniently and detachably secured when needed.

To the attainment of this general object, I provide a circumferential attaching device which may be securely clamped to the outside of the brake-drum of a vehicle wheel and which may be left in operative position thereon for any desired period.

I also provide improved attaching plates for the cross chains, together with means for securing the cross chains on the tire and for taking up slack therein.

My invention further relates to arrangements and combinations of parts which will be hereinafter described and more particularly pointed out in the appended claims.

Preferred forms of the invention are shown in the drawings, in which

Fig. 1 is a side elevation of a preferred construction of my new attaching device;

Fig. 2 is an enlarged detail view, looking in the direction of the arrow 2 in Fig. 1;

Fig. 3 is a plan view of a pair of cross chains and associated attaching plates;

Figs. 4 and 5 are enlarged edge views of the attaching plates shown at the top and bottom of Fig. 3 respectively;

Fig. 6 is a partial front view of a wheel showing my improved means for preliminarily assembling the cross chains and for connecting the outer cross chain plates together;

Figure 7:
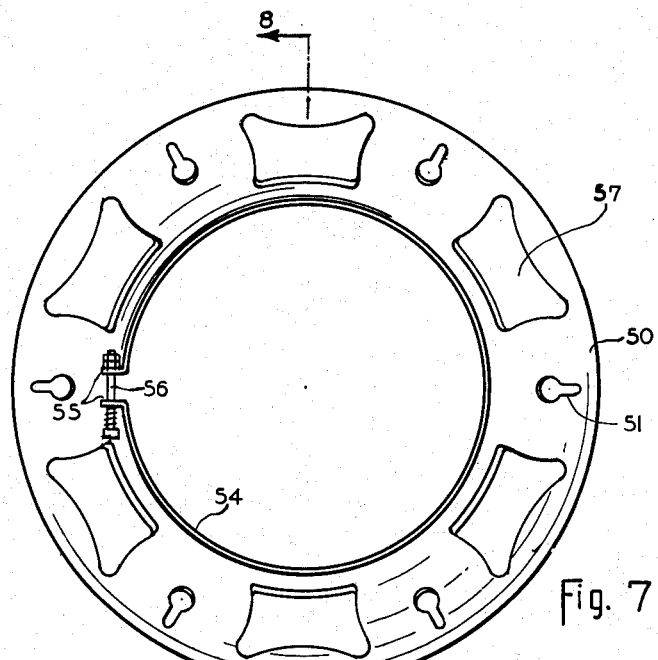
Fig. 7 is a rear view of a modified attaching device.

Referring particularly to the construction shown in Figs. 1 to 5 inclusive, I have shown my improved attaching device as mounted on the outside of a brake-drum 10 of usual construction and associated with a car axle 12.

My improved attaching device comprises an annular ring 14 of heavy wire or rod, a band 16 of flat and more or less resilient steel, and a plurality of arms or brackets 20, each of which brackets is welded to the band 16 at its inner end and is welded to the annular ring 14 at its outer end. Each bracket 20 has a key-hole slot or opening 22 in its outer end portion, as clearly shown in Fig. 2.

The band 16 has adjacent up-turned ends 24 and 25 (Fig. 1), and these ends have holes therein to receive a clamping bolt 27. A relatively heavy coil spring 28 may be mounted outside of the up-turned end 25, and the opposite end of the bolt is threaded to receive lock nuts 30. By tightening the nuts, any desired tension may be placed on the band 16, and the spring 28 prevents slack or rattling.

It will be clear that this attaching device does not interfere with any other part of the automobile, so that it may be left in place on the brake-drum 10 for any desired period, or permanently if desired.

In Fig. 3, I have shown a pair of cross chains C provided with inner and outer end plates 32 and 33. Each inner plate 32 is shown in Fig. 4 as having a headed stud 35 of substantial size, and each stud 35 is adapted to be inserted in one of the key-hold slots or openings 22 in one of the arms or brackets 20. After a stud 35 is thus inserted, the associated chain or chains C are brought around and over the tire.

Each outer plate 33 has an upper hook 42, and these hooks are used in preliminary assembly of the chains by mounting a light coil spring 43 on said hooks. When all of the cross chains C are in place, the holding chain 39 (Fig. 6) is placed on outer hooks 40 on the plates 33. The spring 43 may then be removed.

Any usual spring means (not shown) may be utilized to tighten the chain 39 and prevent slack or rattling thereof.

With this construction, the cross chains are very easily attached when needed and are firmly held in position while in use.

Figure 8:
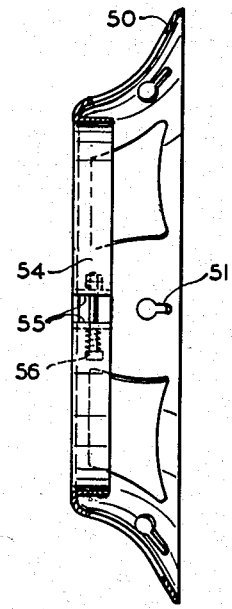
Fig. 8 is a sectional view, taken along the line 8—8 in Fig. 7.

The construction shown in Figs. 7 and 8 is similar in utility but is shown in the form of a single sheet metal disc 50 having key-hole slots 51 spaced about its periphery and having an encircling band 54 at its inner edge. This band is provided with out-turned ends 55 to receive a clamping bolt 56, as in the construction previously described. The band 54 may be integral with the disc 50 or may be a separate element welded thereto. The openings 57 in the disc 50 are merely to save weight.

This form of my invention is mounted on a brake-drum exactly as previously described and, when so attached, it functions exactly the same as the construction shown in Fig. 1.

Figure 9:
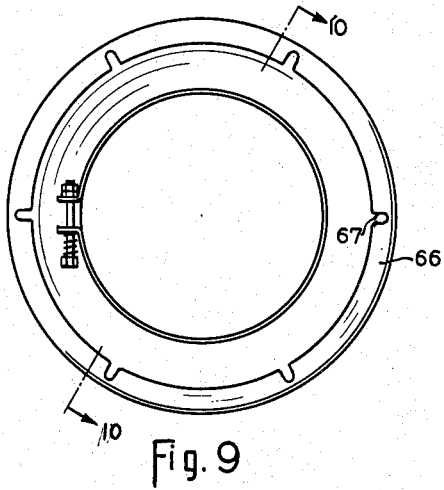
Fig. 9 is a rear view of a second modification.
Figure 10:
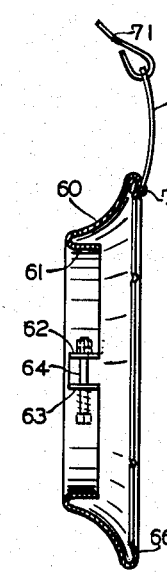
Fig. 10 is a sectional view, taken along the line 10—10 in Fig. 9.

In the construction shown in Figs. 9 and 10, a metal disc 60 is provided with a cylindrical inner flange 61 having end portions 62 and 63 connected by a clamping bolt 64, as in the construction shown in Figs. 7 and 8 and previously described.

The outer edge of the disc 60 is reversely curved and bent to provide an inwardly-projecting flange 66 having a plurality of spaced notches 67 about its internal edge. Attaching plates 70 of the cross chains 71 may be secured to the disc 60 by inserting their studs 72 in the slots 67.

With this construction, it is very easy to connect a cross chain to the disc by merely sliding the stud around the internal surface of the flange 66 until it enters one of the notches 67. Furthermore, the outer surface of the disc presents a smooth and continuous surface which would be less liable to cause damage in the case of a flat tire.

Having thus described my invention and the advantages thereof, I do not wish to be limited to the details herein disclosed, otherwise than as set forth in the claims, but what I claim is:

1. Means for attaching pairs of cross chains to a tire supported on a wheel having a substantially cylindrical brake drum, comprising a resilient band encircling said drum, means securing said band to the drum, a plurality of brackets disposed in circumferentially spaced relation about the drum and secured thereto, said brackets projecting axially inwardly and radially and outwardly from said drum, said brackets being provided with key-hole slots in their outer ends, an annular ring secured to said outer ends and closing said slots, each of said pairs of cross chains having corresponding opposite ends thereof secured to an inner plate and an outer plate, said inner plates having headed studs receivable within said slots and engageable with said ring, said outer plates being provided with hook means, and circumferential tension means disposable within said hook means for retaining said cross chains in engagement with the tread portion of the tire.

2. The structure according to claim 1, wherein said hook means comprise a pair of inner and outer hooks on each outer plate opening radially outwardly, and said tension means comprising a circumferential light coil spring disposable within said outer hooks and a retaining chain disposable within said inner hooks.

References Cited in the file of this patent

UNITED STATES PATENTS

| | | |
|---|---|---|
| 2,204,783 | Wettlaufer | June 18, 1940 |
| 2,625,441 | De Ragon | Jan. 13, 1953 |